Patented Mar. 12, 1946

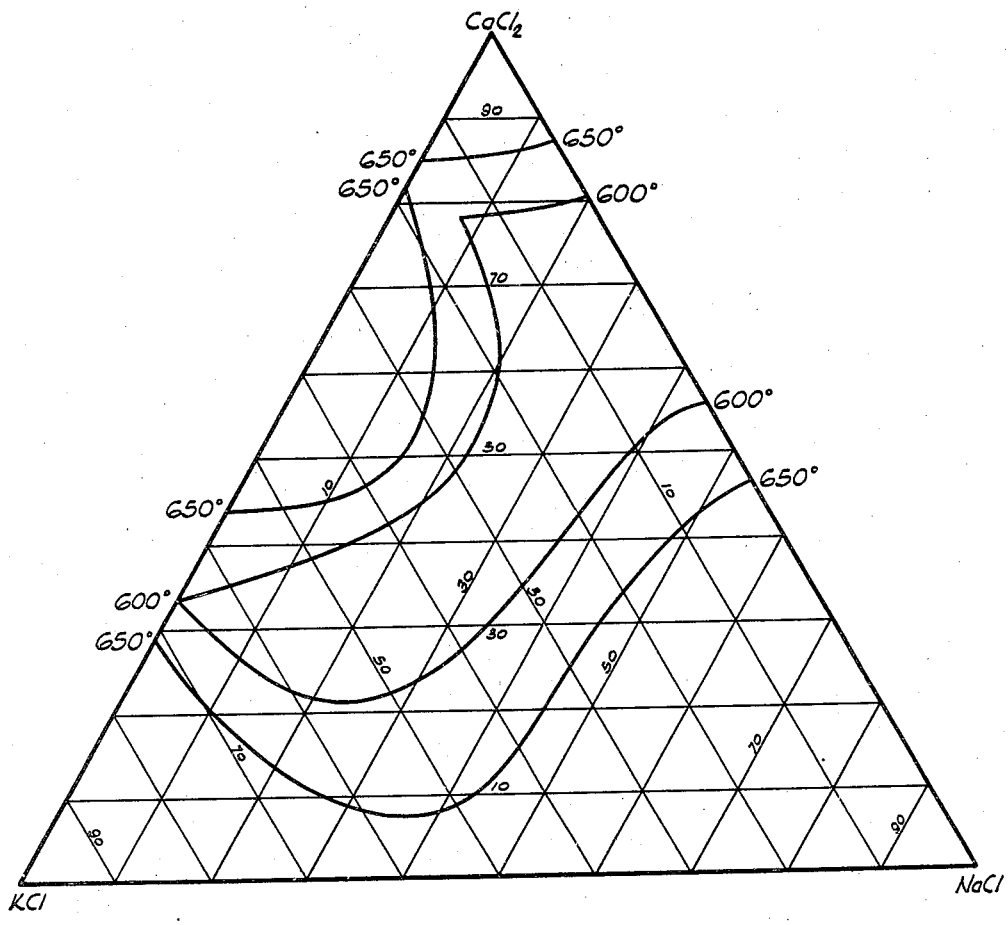

2,396,604

UNITED STATES PATENT OFFICE 2,396,604

WELDING FLUX FOR MAGNESIUM ALLOYS

Hans A. Reimers, Midland, Mich., assignor to The Dow Chemical Company, Midland, Mich., a corporation of Michigan Application November 21, 1942, Serial No. 466,415

3 Claims. (Cl. 148—26)

This invention concerns certain new flux compositions for use in welding magnesium-base alloys.

A flux composition, to be useful in the welding of magnesium-base alloys, must possess a considerable number of characteristics not ordinarily found in fluxes employed in welding other metals. It must be capable of being applied in a variety of ways, as a dry powder, as a core of the filler rod, or as a paste. It should flow readily over the molten weld metal to protect it from oxidation by the air and should exert a solvent action on any magnesium oxide present to insure the production of clean welds. It should not evolve gases on heating, react with hot magnesium to cause pitting, or introduce metallic impurities into the weld metal. It ought preferably to have a density approximating that of molten magnesium, so that it will not remain embedded, even to a very minor extent, in the solidified weld metal, and thus to produce flux inclusions giving rise to serious corrosion. In addition, it should be easily removable from the welded piece, as by wire-brushing or washing, and should have no adverse chemical effect on the treating solutions in which finished magnesium articles are conventionally dipped to form protective surface coatings. No flux having all these qualities has been available heretofore, the fluxes actually used being at best compromises designed to exhibit undesired properties to the minimum extent possible.

The principal object of the present invention, then, is to provide a flux which avoids the disadvantages of known compositions and possesses to a high degree the essential characteristics mentioned. Another object is to provide a flux which may be easily compounded from inexpensive ingredients.

The fluxes of the invention consist of mixtures of calcium chloride and potassium chloride, and preferably also sodium chloride, to which a fluoride is added in a proportion representing between about 0.5 and about 10 per cent by weight of the total composition, heavy metal salts being substantially absent.

The new compositions may best be defined in relation to the ternary system $CaCl_2$—$KCl$—$NaCl$, since, as stated, mixtures of these salts make up 90 to 99.5 per cent of the total flux. In general, the constituents of the $CaCl_2$—$KCl$—$NaCl$ portion of the flux should be present within the approximate limits

| | Per cent by weight |
|---|---|
| Calcium chloride | 25 to 50 |
| Potassium chloride | 20 to 65 |
| Sodium chloride | 5 to 40 | and in such proportions relative to one another that their mixture has a melting point below 650° C. Most advantageous properties are obtained when these ingredients are in such relative proportions that the ternary mixture has a melting point below 600° C., since the fluxes containing these lower melting mixtures have low viscosities at welding temperatures.

The precise compositions of the chloride mixtures having the desired melting points may readily be determined with reference to the accompanying drawing, in which there is reproduced the known ternary diagram for the system $CaCl_2$—$KCl$—$NaCl$ in per cent by weight, showing the 650° C. and 600° C. isotherms. A similar graph, in mol per cent, appears in the International Critical Tables, vol. IV, page 81.

It is highly desirable, to obtain optimum results, that the proportions of all ingredients of the flux be controlled within the limits set forth. Thus, as stated, calcium chloride should preferably represent from about 25 to about 50 per cent by weight of the chloride components of the flux; concentrations much above 50 per cent, although not affecting the ease of welding or quality of the welded product, result in a flux which is somewhat less satisfactory in that it is more reactive with metallic magnesium, is somewhat hygroscopic, and tends on cooling to form a glass-like film on the weld which is not easily removed by washing. Likewise, the potassium chloride should preferably represent from 20 to 65 per cent of the chloride mixture to produce a flux of optimum fluidity, and the sodium chloride from 5 to 40 per cent to insure maximum cleaning action of the flux on the welding bead.

The fluoride component of the new fluxes is preferably sodium fluoride, although other fluorides, especially those of potassium, magnesium, calcium, barium, aluminum, beryllium, and strontium may also be used. The fluoride should, as stated, represent between about 0.5 and about 10 per cent by weight of the flux, proportions in the range 2 to 6 per cent being particularly advantageous. Quantities less than 0.5 per cent of fluoride in the flux are insufficient to cause adequate coalescence of the molten metal, whereas amounts above about 10 per cent cause "spongy" welds.

In practice, the flux compositions of the invention may be compounded in any manner capable of forming an intimate mixture of the ingredients, e. g. by grinding the anhydrous salts together in a ball mill, or by interfusing the salts, cooling, and pulverizing the solidified mass. In welding, enough of the composition to flux the weld satisfactorily may ordinarily be applied to the magnesium-base alloy work simply by dipping the hot welding rod into the powdered mixture. Alternatively the flux may be applied as a paste, being admixed with water, alcohol, or oil to produce the desired consistency and then brushed on the weld rod or work.

Examples of fluxes according to the invention which have been used successfully are the following salt mixtures, all proportions being in per cent by weight:

Example 1

| | | |
|---|---|---|
| Sodium fluoride | per cent | 8 |
| Calcium chloride, 47% | | |
| Sodium chloride, 21% | do | 92 |
| Potassium chloride, 32% | | |
| Melting point of the CaCl₂—NaCl—KCl mixture | °C | 603 |

Example 2

| | | |
|---|---|---|
| Potassium fluoride | per cent | 5 |
| Calcium chloride, 31.6% | | |
| Sodium chloride, 12.6% | do | 95 |
| Potassium chloride, 55.8% | | |
| Melting point of the CaCl₂—NaCl—KCl mixture | °C | 570 |

The fluoride percentage is in every case based on the total composition, while the relative proportions of calcium chloride, potassium chloride and sodium chloride are given in terms of the mixture of these three components alone, for convenience in referring to the accompanying ternary diagram.

The foregoing description is illustrative rather than strictly limitative, the invention being coextensive in scope with the following claims.

This application is a continuation-in-part of my prior application Serial No. 409,043, filed August 30, 1941, now United States Patent 2,327,065.

What is claimed is:

1. A flux for use in welding magnesium-base alloys which consists of: (a) a mixture of calcium chloride, potassium chloride, and sodium chloride in such relative proportions within the approximate limits

| | Per cent by weight |
|---|---|
| Calcium chloride | 25 to 50 |
| Potassium chloride | 20 to 65 |
| Sodium chloride | 5 to 40 | that the mixture has a melting point below 650° C., and (b) a fluoride in a proportion representing between about 0.5 and about 10 per cent by weight of the total composition, said flux being substantially free of heavy metal salts.

2. A flux for use in welding magnesium-base alloys which consists of: (a) a mixture of calcium chloride, potassium chloride, and sodium chloride in such relative proportions within the approximate limits

| | Per cent by weight |
|---|---|
| Calcium chloride | 25 to 50 |
| Potassium chloride | 20 to 65 |
| Sodium chloride | 5 to 40 | that the mixture has a melting point below 600° C., and (b) a fluoride of a metal selected from the class consisting of sodium, potassium, magnesium, calcium, barium, aluminum, beryllium, and strontium in a proportion representing between about 2 and about 6 per cent by weight of the total composition, said flux being substantially free of heavy metal salts.

3. A flux according to claim 2 wherein the fluoride is sodium fluoride.

HANS A. REIMERS.